(12) United States Patent
Thompson

(10) Patent No.: US 10,493,844 B2
(45) Date of Patent: Dec. 3, 2019

(54) GEARING ASSEMBLY, VEHICLE DRIVETRAIN AND ELECTRIC WHEEL HUB THEREWITH

(71) Applicant: QINETIQ LIMITED, Farnborough, Hampshire (GB)

(72) Inventor: Robert William Thompson, Camberley (GB)

(73) Assignee: QINETIQ LIMITED, Hampshire (GB)

( * ) Notice: Subject to any disclaimer, the term of this patent is extended or adjusted under 35 U.S.C. 154(b) by 39 days.

(21) Appl. No.: 15/557,771

(22) PCT Filed: Mar. 15, 2016

(86) PCT No.: PCT/EP2016/055544
§ 371 (c)(1),
(2) Date: Sep. 12, 2017

(87) PCT Pub. No.: WO2016/146628
PCT Pub. Date: Sep. 22, 2016

(65) Prior Publication Data
US 2018/0072154 A1 Mar. 15, 2018

(30) Foreign Application Priority Data
Mar. 17, 2015 (GB) .................................. 1504469.6

(51) Int. Cl.
*B60K 17/04* (2006.01)
*F16H 3/66* (2006.01)
(Continued)

(52) U.S. Cl.
CPC .......... *B60K 17/046* (2013.01); *B60K 7/0007* (2013.01); *B60K 17/043* (2013.01);
(Continued)

(58) Field of Classification Search
CPC ..... F16H 2200/2094; F16H 2200/0039; F16H 2200/2007; F16H 2200/0021; F16H 2200/2097
See application file for complete search history.

(56) References Cited

U.S. PATENT DOCUMENTS 5,443,130 A * 8/1995 Tanaka ..................... B60K 1/00
180/65.6
9,527,382 B2 * 12/2016 Smetana .................. B60K 1/02
(Continued)

FOREIGN PATENT DOCUMENTS

EP 1692416 B1 6/2007
WO WO2011/145937 A1 11/2011

OTHER PUBLICATIONS

International Search Report for PCT Patent App. No. PCT/EP2016/055544 dated May 24, 2016.
(Continued)

*Primary Examiner* — Jacob S. Scott
*Assistant Examiner* — James J Taylor, II
(74) *Attorney, Agent, or Firm* — Kenealy Vaidya LLP

(57) ABSTRACT

A gearing assembly includes a rotary input member, a rotary output member, and a gearing arrangement between the input member and the output member selectively able to effect a driving engagement between the input member and the output member through at least a first torque connection having a first gear ratio. A second torque connection has a second gear ratio and a third torque connection having a third gear ratio. The gearing arrangement includes a first engagement member operable selectively to effect the first torque connection in a 1:1 ratio, a first planetary gear stage, and a second planetary gear stage. A second engagement member is operable selectively to effect the second torque connection, and a third engagement member operable selec-
(Continued)

tively to effect the third torque connection, respectively, through one or more of the planetary gear stages.

18 Claims, 1 Drawing Sheet

(51) Int. Cl.
    *B60K 17/08*     (2006.01)
    *F16H 3/44*     (2006.01)
    *B60K 7/00*     (2006.01)
    *B60K 1/00*     (2006.01)

(52) U.S. Cl.
    CPC ............... *B60K 17/08* (2013.01); *F16H 3/66* (2013.01); *B60K 2001/001* (2013.01); *B60K 2007/0038* (2013.01); *B60K 2007/0092* (2013.01); *F16H 2003/447* (2013.01); *F16H 2200/0021* (2013.01); *F16H 2200/0039* (2013.01); *F16H 2200/2007* (2013.01); *F16H 2200/2035* (2013.01); *F16H 2200/2038* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 9,868,349 B2 * | 1/2018 | Pritchard | B60K 17/02 |
| 2005/0054477 A1 * | 3/2005 | Tiesler | F16H 3/663 |
| | | | 475/284 |
| 2010/0190602 A1 | 7/2010 | Wittkopp et al. | |
| 2012/0129646 A1 | 5/2012 | Kim | |
| 2012/0258830 A1 | 10/2012 | Yoon et al. | |
| 2015/0167788 A1 * | 6/2015 | Beck | F16H 3/66 |
| | | | 475/149 |
| 2015/0167789 A1 * | 6/2015 | Beck | F16H 3/66 |
| | | | 475/149 |
| 2017/0326961 A1 * | 11/2017 | Milosavljevic | B60K 6/383 |

OTHER PUBLICATIONS

Written Opinion for PCT Patent App. No. PCT/EP2016/055544 dated May 24, 2016.

Search Report for GB Patent App. No. 1504469.6 dated Sep. 4, 2015.

* cited by examiner

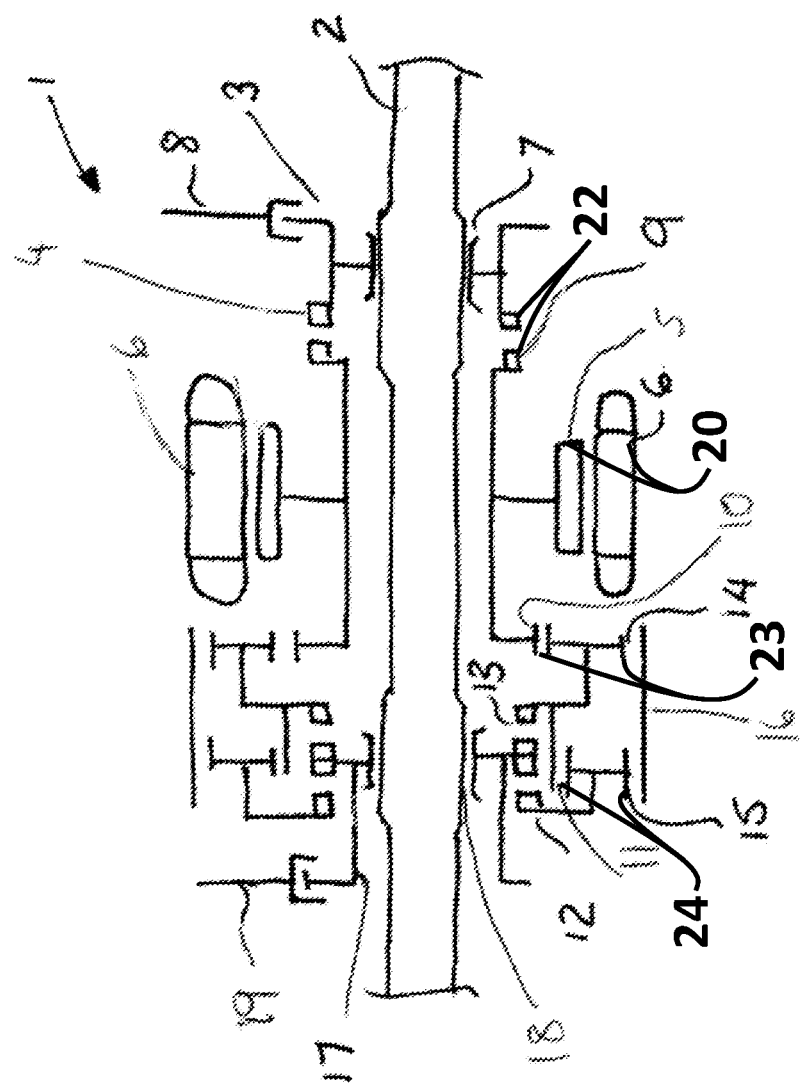

GEARING ASSEMBLY, VEHICLE DRIVETRAIN AND ELECTRIC WHEEL HUB THEREWITH

CROSS REFERENCE TO RELATED APPLICATION(S)

This application is a national phase filing under 35 C.F.R § 371 of and claims priority to PCT Patent Application No. PCT/EP2016/055544, filed on Mar. 15, 2016, which claims the priority benefit under 35 U.S.C. § 119 of British Patent Application No. 1504469.6, filed on Mar. 17, 2015, the contents of each of which are hereby incorporated in their entireties by reference.

BACKGROUND

Some embodiments relate to a gearing assembly, and in particular a gearing assembly configured to provide at least three ratios including 1:1 in a simplified and compact manner.

Assemblies according to some embodiments may be found useful in a variety of vehicular applications or in other machinery where a simple, robust and compact gearbox is required. Gearing assemblies are used commonly on vehicles where it is desired to drive a wheel or axle at a different rotational speed to the revolutions of an engine. Assemblies according to some embodiments may find particular application in a gearing system for an electrical hub drive, and applications of some embodiments are discussed herein in that context by way of example, although some embodiments are not limited to such applications.

Electric hub drives, or hub-mounted electric drive (HMED) units are finding increasing use on vehicles where it is advantageous for the wheels to be driven independently. Applications include for example large vehicles and, vehicles adapted for use on difficult and for example steep or uneven terrain. HMED units are finding increasing use on hybrid vehicles. HMED units are finding increasing use on military vehicles particularly for use on difficult terrain.

Each wheel is provided with a hub-mounted electric drive assembly typically including a housing containing an electric motor, and a drivetrain including a drive shaft, arranged inside a suitable hub-mounted housing. An output shaft of the hub drive drives the wheel. The hub drive assembly must fit within the space available inside the diameter and the overall width of the wheel rim and tyre assembly.

The use of individual hub-mounted electric drive units eliminate the need for conventional transmission and drive shafts and offers enhanced vehicle capabilities through improvements in vehicle performance, fuel economy, design configuration, increased stealth capability and reduced whole-life costs.

An electric hub drive needs to have large torque range and a large speed range, and should be compact. A multi-speed gear change mechanism is desirable to facilitate this. Higher gear ratios can be used to provide higher torques at lower speeds and lower gear ratios can be used to allow for higher speeds (with low available output torque).

A gearing assembly with two speeds including a 1:1 ratio and a planetary gear set reduction selectively engageable by mechanism of a simple and compact dog clutch arrangement is described in EP1692416. An adaptation of this mechanism to provide a third ratio for example by provision of a second planetary gear set in series with the first could significantly complicate the required dog clutch arrangement. For example a dog clutch for high gear selection may be provided inside a tubular shaft between the motor rotor and the sun gear of the mid stage with radial pins and slots for actuation.

SUMMARY

A simpler mechanism is desirable, and in particular one that remains compact at least in the axial direction such as for application for example in electric hub drives.

In accordance with some embodiments, a gearing assembly includes a rotary input member and a rotary output member and a gearing arrangement between the input member and the output member selectively engageable to effect a driving engagement between the input member and the output member through at least a first torque connection having a first gear ratio, a second torque connection having a second gear ratio and a third torque connection having a third gear ratio; wherein the gearing arrangement includes a first engagement member operable selectively to effect the first torque connection in a 1:1 ratio, a first planetary gear stage and a second planetary gear stage, and a second engagement member operable selectively to effect the second torque connection and a third engagement member operable selectively to effect the third torque connection respectively through one or more of the planetary gear stages; and wherein the first engagement member is located on a first side of the input member and the first planetary gear stage, second engagement member, second planetary gear stage and third engagement member are located on a second side of the input member opposite to the first side.

More or most conveniently, to achieve the desired three different ratios, the second torque connection is effected through one of the planetary gear stages and for example the first planetary gear stage and the third torque connection is effected through the first planetary gear stage and the second planetary gear stage in series.

Thus, in this advantageous or preferred case, the gearing arrangement includes a first engagement member operable selectively to effect driving engagement between the input member and the output member in a first 1:1 ratio, a first planetary gear stage and a second engagement member operable selectively to effect driving engagement between the input member and the output member through the first planetary gear stage, and a second planetary gear stage and a third engagement member operable selectively to effect driving engagement between the input member and the output member through the first planetary gear stage and the second planetary gear stage in series; wherein the first engagement member is located on a first side of the input member and the first planetary gear stage, second engagement member, second planetary gear stage and third engagement member are located on a second side of the input member opposite to the first side.

The input member is driven by a suitable rotary drive mechanism. In a more complete embodiment, the assembly further includes a rotary drive mechanism to drive the input member, and the first engagement member is located on a first side of the rotary drive mechanism and the first planetary gear stage, second engagement member, second planetary gear stage and third engagement member are located on a second side of the rotary drive mechanism opposite to the first side.

Some embodiments position the first engagement member that effects a driving engagement between the input member and the output member in a 1:1 ratio on the opposite side of the input member from the two planetary gear sets, and in the more complete embodiment on the opposite side of the rotary drive mechanism from the two planetary gear sets.

This enables a second planetary gear set to be added serially to the first, for example to exploit and develop upon the principles embodied and advantages offered by the two-speed single planetary stage system of EP1692416, but in a manner which avoids the particular difficulties that would arise if the first engagement member were more conventionally mounted on the same side as the planetary gear sets. Such an arrangement presents particular difficulties with multiple planetary gear systems, as a complex mechanism is then required to allow actuation of the 1:1 ratio engagement member through the rotating output shaft. This problem is avoided by providing the 1:1 ratio engagement member on the other side of the input shaft/drive mechanism.

The first torque connection is effected by a first engagement member to provide a gear ratio of 1:1 (as a ratio of input member:output member angular velocity). Although this may for convenience be referred to herein as one of the three speeds of the gearing arrangement, this torque connection is ungeared.

For example, in a convenient embodiment, the first engagement member includes a selectively engageable coupler is engageable to effect a driving engagement directly between the input member and the output member.

Advantageously or preferably, the first engagement member includes a first dog clutch arrangement. Preferably the dog clutch arrangement includes an annular dog ring.

Advantageously or preferably, the first engagement member is provided with a first actuator to effect its selective engagement and disengagement. Preferably the first actuator includes a first selector hub such as a dog hub borne for axial movement relative to the output member to effect selective engagement of the first engagement member for example being the first dog clutch. Preferably the first actuator additionally includes a shift fork to effect axial movement of the first selector hub.

The second and third torque connections are provided by the arrangement of the first planetary gear stage and the second planetary gear stage at an opposite side of the input member, and in consequence typically at an opposite side of a rotary drive mechanism driving the input member.

Each planetary gear stage typically includes in familiar manner a sun gear, at least one planet gear and more usually a set of planet gears circumferentially distributed about and meshing with the sun gear and borne by a common planet carrier co-axially located with the sun gear, and an annulus meshing with the planet gear(s), a first of the sun gear, planet carrier, or annulus configured to be driven on an input side of the gear stage, a second of the sun gear, planet carrier, or annulus configured to rotate on an output side of the gear stage.

Each sun gear, planet gear and annulus is adapted for meshing engagement with its counterparts to effect coupled rotation in familiar manner. Typically, each gear has a planar gear body with a plurality of identically sized and evenly circumferentially spaced teeth. For compactness and torque balance a plurality of identical planet gears are preferably provided distributed about the sun gear. For example three to six planet gears are provided in association with a sun gear.

In an advantageous or preferred arrangement, each planetary gear stage is configured as a reduction gear in which the sun gear is arranged to be driven on an input side of the gear stage, the planet carrier is arranged to rotate on an output side of the gear and the annulus is held non-rotatably.

In an advantageous or preferred arrangement, the two planetary gear stages are configured to deliver a second torque connection has an intermediate gear ratio greater than 1:1 but less than that of the third torque connection, and a third torque connection has a gear ratio of greater than 1:1 and greater than that of the second torque connection.

Conveniently, this is achieved in that the second torque connection is effected through the first planetary gear stage and the third torque connection is effected through the first planetary gear stage and the second planetary gear stage in series.

Advantageously or preferably, the first and second planetary gear stages are identical.

Advantageously or preferably, the first and second planetary gear stages are disposed coaxially and adjacent to each other.

Advantageously or preferably, the first and second planetary gear stages are provided with a common annulus.

Advantageously or preferably, the first and second planetary gear stages are each configured to produce a gear ratio of between 2.5:1 and 3:1 and for example a ratio of approximately 2.7:1.

This reduction ratio is ideal as it matches the requirements of typical traction motors which can readily be made to deliver constant power over a 3:1 speed range. Two gear stages of approximately 2.7:1 arranged serially gives a mechanical ratio spread of approximately 7:1 and combined with the traction motor speed range gives an overall range of approximately 20:1.

The second and third torque connections are provided through the arrangement of the first planetary gear stage and the second planetary gear stage. In the preferred case the second torque connection is effected by creating a driving engagement between the input member and the output member through the first planetary gear stage and the third torque connection is effected by creating a driving engagement between the input member and the output member through the first planetary gear stage and the second planetary gear stage in series.

The second torque connection is effected by the second engagement member. Preferably the second engagement member includes a selectively engageable coupler is engageable to effect a driving engagement between the input member and the output member through the first planetary gear stage. Preferably, the second engagement member includes a second dog clutch arrangement. Preferably the dog clutch arrangement includes an annular dog ring.

The third torque connection is effected by the second engagement member. Preferably the third engagement member includes a selectively engageable coupler is engageable to effect a driving engagement between the input member and the output member through the first and second planetary gear stages in series. Advantageously or preferably, the third engagement member includes a third dog clutch arrangement. Advantageously or preferably, the dog clutch arrangement includes an annular dog ring.

Advantageously or preferably, the second engagement member is provided with an actuator to effect its selective engagement and disengagement. Preferably, the third engagement member is provided with an actuator to effect its selective engagement and disengagement. Conveniently a second actuator is provided to effect selective engagement of one, other or neither of the second and third engagement members. For example the second actuator includes a second selector hub such as a second dog hub borne for axial movement relative to the output member to effect selective engagement of one, other or neither of the second and third engagement members being for example the second and third dog clutches. Advantageously or preferably, the second actuator additionally includes a shift fork to effect axial movement of the second selector hub.

The input member is driven by a suitable rotary drive mechanism. Preferably, the drive mechanism is one of an electric motor, a spur gear, a belt drive, a hydraulic motor or a connection to a remote motor. The input member is for example an input shaft directly mechanically coupled to or integrally formed with a motor rotor of the rotary drive mechanism.

The output member conveys output rotary drive to a driven system, for example to a vehicle drive transmission system. The output member is for example an output shaft directly mechanically coupled to or integrally formed with a driveshaft of the system to be driven.

Advantageously or preferably, the input member is disposed coaxially with and around the output member. Advantageously or preferably, the output member extends axially beyond the input member on either side, the first engagement mechanism being disposed in association with and for example around such axial extension on a first side, and the first planetary gear stage, second engagement member, second planetary gear stage and third engagement member being disposed in association with and for example around such axial extension on a second side.

For example, the input member includes a motor rotor of a rotary electric motor, the output member includes a driveshaft, and the motor rotor is an annular rotor disposed coaxially with and around the driveshaft, the driveshaft extending axially beyond the annular motor rotor on either side.

Advantageously or preferably, the gearing assembly provides a three speed drive configuration. The gearing assembly may be further modified to provide further speeds.

In another aspect, some embodiments also provide a vehicle drivetrain including the gearing assembly described above.

In another aspect, some embodiments also provide an electric wheel hub drive containing the gearing assembly described above.

BRIEF DESCRIPTION OF THE DRAWINGS

Some embodiments will now be described by way of example only, and with reference to the following drawing, in which:

FIG. 1 is a schematic cross section of a gearing assembly in accordance with some embodiments.

DETAILED DESCRIPTION OF EXEMPLARY EMBODIMENTS

Some embodiments include a drive configuration providing three gear ratios including 1:1. An electric rotary drive traction motor rotor is coupled to an output drive shaft either directly, through one planetary gear reduction, or through two planetary gear reductions in series.

In order to deal with the issues raised above relating to regarding accessibility for actuation of the direct coupling, some embodiments the approach of splitting the gearing assembly and placing the direct coupling on a first side of the traction motor and the planetary gear reductions on a second side of the traction motor. This drive configuration, having the high engagement system on one side of the traction motor and the planetary gears and the mid/low engagement system on the other side of the motor allows a simplified mechanism.

FIG. 1 is a schematic cross section of a drive configuration generally denoted 1 including a gearing assembly in accordance with some embodiments. The gearing assembly includes a gearing arrangement that is adapted to engage with and provide rotary output drive to a drive shaft 2. Rotary input 20 is provided from a rotary electric traction motor via a motor rotor 5 driven by an annular stator 6. The motor rotor 5 annularly surrounds the drive shaft 2 which extends axially beyond it on either side. A 1:1 rotor to driveshaft engagement mechanism is disposed to engage upon a first such axial extension on a first side of the traction motor, and a planetary gearing system offering two further ratios, is disposed and in particular two reduction ratios, on a second such axial extension on a second side of the traction motor. High, mid and low dog clutches effect selective engagement of the three ratios, in FIG. 1 all shown disengaged.

The first 1:1 engagement mechanism includes a first, high dog clutch 9 provided with a set of selectively engageable and disengageable dogs to effect a first torque connection between the motor rotor and the driveshaft in a 1:1 ratio. Selective engagement and disengagement is effected by axial movement of a first selector hub 3. The first selector hub 3 has an annular body surrounding the shaft 2 and provided on the left hand side (as shown) with a set of dogs complementarily structured with dogs of the first dog clutch. The selector hub 4 is borne for axial movement relative to the drive shaft by mechanism of a splined connection 7 so that the hub and shaft must turn together but the hub is able to slide axially on the shaft to and fro from the position illustrated in FIG. 1. Axial movement is effected by an operator using the shift fork 8. To engage the 1:1 ratio the selector hub 4 is moved to the left (as shown) and a torque transfer engagement is effected between the high dog clutch 9 and the first selector hub 3 whereby the input of the motor rotor is coupled to the output of the drive shaft in 1:1 ratio.

The other two gear ratios, respectively a mid gear and a low gear, are provided by selective engagement of the planetary gear system disposed on the other side of the traction motor.

First and second planetary gear stages 23, 24 are arranged in series and respectively include a first sun gear 10 meshed with a first planet gear set 14 and a second sun gear 11 meshed with a second planet gear set 15, with a common ring gear 16. Both gear stages 23, 24 are arranged as reduction gears, with the sun gear as the input and the planet carrier as the output, and with the common ring gear held non-rotatably.

A second, mid dog clutch 13 and a third, low dog clutch 12 each provided with a set of selectively engageable and disengageable dogs are provided to effect respectively a second torque connection between the motor rotor and the drive shaft and a third second torque connection between the motor rotor and the drive shaft at the respective second and third ratios. Selective engagement and disengagement to effect a mid gear or low gear connection is effected by axial movement of a second selector hub 17.

The second selector hub 17 has an annular body surrounding the shaft 2 and provided on both sides with a set of dogs complementarily structured with dogs of a respective dog clutch. The second selector hub 17 is borne for axial movement relative to the drive shaft by mechanism of a second splined connection 18 so that the hub and shaft turn together but the hub is able to slide axially on the shaft to and fro from the position illustrated in FIG. 1, in which neither dog clutch is engaged. Axial movement is effected by an operator using the shift fork 19. To engage the mid gear the second selector hub 17 is moved to the right (as shown) and a torque transfer engagement is effected between the mid dog clutch 13 and the complementary dogs on the second selector hub 17 whereby the input of the motor rotor is coupled to the output of the drive shaft via the first planetary gear stage 23 only. To engage the low gear the second selector hub 17 is moved to the left (as shown) and a torque transfer engagement is effected between the low dog clutch 12 and the complementary dogs on the second selector hub 17 whereby the input of the motor rotor is coupled to the output of the drive shaft via the first planetary gear stage 23 and the second planetary gear stage 24 successively in series.

Thus, the system provides three selectable ratios. Using the above configuration the high 9, mid 13 and low 12 dog clutches are used to couple the rotor 5 to the drive shaft 2 respectively directly, through one planetary gear reduction or through two planetary gear reductions in series. As the lowest gear is achieved in the embodiment by using the two reduction stages in series, the ratios of those two stages need not be different and are preferably identical, although they may differ if desired, and other planetary gear arrangements might be considered to achieve mid and low gears.

Advantageously or preferably, the two planetary gear stages 23, 24 are configured with relatively low reduction ratios for example of approximately 2.7:1 per stage. The planet gears are correspondingly small in comparison with the sun gears 10, 11. Two gear stages 23, 24 of approximately 2.7:1 per stage gives a mechanical ratio of approximately 7:1 when the two stages are combined in series, which combined with a typical electrical traction motor range results in a range of approximately 20:1.

The use of a planetary gear reduction with a ratio of approximately 2.7:1 with relatively small planet gears and large sun gears is further advantageous as this enables the space insider the sun gears 10, 11 to house dog clutch components for engaging the mid and low gear ranges.

The drive configuration of this embodiment, by placing the high engagement dog clutch system on one side of the traction motor and the planetary gears and the mid/low engagement dog clutch system on the other side of the motor allows a simplified mechanism. By contrast, keeping the high dog clutch on the same side of the motor as the two planetary gear stages 23, 24 would require a more complex arrangement, for example locating a dog inside a tubular traction motor output shaft with radial slots and pins to allow actuation.

These and other advantageous or preferred embodiments will be apparent from the appended claims.

The invention claimed is:

1. A gearing assembly, comprising:
   a rotary input member;
   a rotary shaft;
   a gearing arrangement between the rotary input member and the rotary shaft selectively engageable to effect a driving engagement between the rotary input member and the rotary shaft through at least a first torque connection having a first gear ratio, the gearing arrangement including a first engagement member operable selectively to effect the first torque connection in a 1:1 ratio;
   a second torque connection having a second gear ratio;
   a third torque connection having a third gear ratio;
   a first planetary gear stage and a second planetary gear stage;
   the rotary input member and the rotary shaft are configured as a rotary drive mechanism, to drive the rotary shaft, wherein the first engagement member is located on a first side of the rotary drive mechanism, and the first planetary gear stage, a second engagement member, the second planetary gear stage and a third engagement member are located on a second side of the rotary drive mechanism opposite to said first side, and wherein the drive mechanism is configured as an electric motor; and wherein
   the second engagement member operable selectively to effect the second torque connection and the third engagement member operable selectively to effect the third torque connection respectively through one or more of the planetary gear stages.

2. The gearing assembly of claim 1, wherein the planetary gear stages are arranged such that the second torque connection is effected through engagement of the first planetary gear stage, and the third torque connection is effected through engagement of the first planetary gear stage and the second planetary gear stage in series.

3. The gearing assembly of claim 1, wherein the gearing arrangement includes the first engagement member being operable selectively to effect the driving engagement between the rotary input member and the rotary shaft in the first gear ratio, the first planetary gear stage and the second engagement member being operable selectively to effect the driving engagement between the rotary input member and the rotary shaft through the first planetary gear stage, and the second planetary gear stage and the third engagement member operable selectively to effect the driving engagement between the rotary input member and the rotary shaft through the first planetary gear stage and the second planetary gear stage in series.

4. The gearing assembly of claim 1, wherein the first engagement member comprises a selectively engageable coupler engageable to effect the driving engagement directly between the rotary input member and the rotary shaft.

5. The gearing assembly of claim 4, wherein the first engagement member is provided with an actuator to effect its selective engagement and disengagement.

6. The gearing assembly of claim 4, wherein the first engagement member includes a first dog clutch arrangement, wherein the first engagement member is provided with a selector hub borne for axial movement relative to the rotary shaft to effect selective engagement with the first dog clutch arrangement.

7. The gearing assembly of claim 1, wherein the first and second planetary gear stages comprises of a first sun gear, a first and second planet gears radially distributed about and meshing with the first sun gear configured to be borne by a common planet carrier co-axially located with the first sun gear, and a common ring gear, configured as an annulus, meshing with the first and second planet gears.

8. The gearing assembly of claim 7, wherein the first and second planetary gear stages are configured to be used as a reduction gear in which the first sun gear being arranged to be driven on an input side of the first and second planetary gear stage, the planet carrier is arranged to rotate on an output side, opposite to the input side, of the first sun gear; and the common ring gear is held non-rotatably.

9. The gearing assembly of claim 1, wherein each planetary gear stage is configured to produce a gear ratio of between 2.5:1 and 3:1.

10. The gearing assembly of claim 1, wherein the second engagement member comprises a selectively engageable coupler arranged to be engageable to effect the driving engagement between the rotary input member and the rotary shaft through the first planetary gear stage.

11. The gearing assembly of claim 1, wherein the second engagement member includes a second dog clutch arrangement.

12. The gearing assembly of claim 1, wherein the third engagement member comprises a selectively engageable coupler arranged to be engageable to effect the driving engagement between the rotary input member and the rotary shaft through the first planetary gear stage and the second planetary gear stage in series.

13. The gearing assembly of claim 1, wherein the third engagement member includes a third dog clutch arrangement.

14. The gearing assembly of claim 1, further including an actuator configured to effect selective engagement of one, other or neither of the second and third engagement members, wherein the actuator comprises a second selector hub borne for axial movement relative to the rotary shaft to effect selective engagement of one, other or neither of the second and third engagement members.

15. The gearing assembly of claim 1, wherein the rotary input member is disposed coaxially with and around the rotary shaft, the rotary shaft extends axially beyond either the first side of the rotary input member the second side of the rotary input member, the first engagement member being disposed with axial extension on the first side of the rotary input member, and the first planetary gear stage, the second engagement member, the second planetary gear stage and the third engagement member being disposed with axial extension on the second side of the rotary input member.

16. The gearing assembly of claim 15, wherein the rotary input member comprises a motor rotor of the electric motor driven by an annular stator, and the motor rotor is an annular rotor disposed coaxially with and around the rotary shaft, the rotary shaft extending axially beyond the annular motor rotor on either the first side of the rotary input member or the second side of the rotary input member.

17. A vehicle drivetrain, comprising:
the gearing assembly of claim 1.

18. An electric wheel hub drive, comprising:
the gearing assembly of claim 1.

* * * * *